(12) United States Patent
Hayes

(10) Patent No.: US 7,997,902 B2
(45) Date of Patent: Aug. 16, 2011

(54) EDUCATIONAL DEVICE

(76) Inventor: Andrew John Hayes, London (GB)

( * ) Notice: Subject to any disclaimer, the term of this patent is extended or adjusted under 35 U.S.C. 154(b) by 0 days.

(21) Appl. No.: 12/527,926

(22) PCT Filed: Feb. 19, 2008

(86) PCT No.: PCT/GB2008/050107
§ 371 (c)(1),
(2), (4) Date: Nov. 3, 2009

(87) PCT Pub. No.: WO2008/102171
PCT Pub. Date: Aug. 28, 2008

(65) Prior Publication Data
US 2010/0062404 A1    Mar. 11, 2010

(30) Foreign Application Priority Data

Feb. 22, 2007 (EP) ..................... 07102897
Feb. 22, 2007 (GB) .................. 0703459.8

(51) Int. Cl.
*G09B 23/02* (2006.01)
(52) U.S. Cl. ...................................... 434/188
(58) Field of Classification Search ............. 434/188, 434/190, 191, 195, 196, 207, 208
See application file for complete search history.

(56) References Cited

U.S. PATENT DOCUMENTS

| | | | |
|---|---|---|---|
| 2,502,238 A | 3/1950 | Wade et al. | |
| 2,585,458 A | 2/1952 | Gordon | |
| 3,636,230 A | 1/1972 | Tacey | |
| 3,755,924 A | 9/1973 | Langieri, Jr. et al. | |
| 3,766,668 A | 10/1973 | Vogel | |
| 3,808,708 A | 5/1974 | Huskin | |
| 3,935,649 A | 2/1976 | Harte | |
| 4,082,279 A | 4/1978 | McFadden | |
| 4,177,581 A * | 12/1979 | Walker | 434/200 |
| 4,334,869 A | 6/1982 | Wilcox et al. | |
| 5,026,288 A | 6/1991 | Castiglia et al. | |
| 5,120,226 A | 6/1992 | Tsai | |
| 5,167,509 A | 12/1992 | Guffrey | |
| 5,176,577 A | 1/1993 | Pollock | |
| 5,238,408 A * | 8/1993 | Pollock | 434/208 |
| 5,599,188 A * | 2/1997 | Lemos Melendez | 434/195 |

(Continued)

FOREIGN PATENT DOCUMENTS

DE    4140767    6/1993

(Continued)

OTHER PUBLICATIONS

Learning Resources (RTM), "Hundreds Number Board" [online] As shown and described on website. Available from URL: Learning Resources (RTM) [Accessed May 6, 2008] (1 page).

(Continued)

*Primary Examiner* — Kurt Fernstrom
(74) *Attorney, Agent, or Firm* — Wolf, Greenfield & Sacks, P.C.

(57) ABSTRACT

Apparatus for educational use, comprising a plurality of pieces and a regular array of indicia. The pieces are dimensioned and arranged, and the indicia are arrayed, to allow a plurality of the pieces to be juxtaposed adjacent to the indicia, covering a plurality of the indicia, such that each piece covers a single indicium or an integral number of indicia and each indicium covered by a piece is visible through that piece.

28 Claims, 3 Drawing Sheets

U.S. PATENT DOCUMENTS

| | | | |
|---|---|---|---|
| 5,653,594 A | 8/1997 | Lai | |
| 5,716,212 A | 2/1998 | Lee | |
| 5,738,524 A | 4/1998 | Tsao | |
| 6,089,871 A | 7/2000 | Jaffe | |
| 6,575,755 B2* | 6/2003 | Dreyfous | 434/196 |
| 6,695,618 B2* | 2/2004 | Donn | 434/209 |
| 6,769,914 B2* | 8/2004 | Sundararajan | 434/191 |
| 7,052,279 B1* | 5/2006 | Losq | 434/191 |
| 7,104,799 B1* | 9/2006 | Sansing | 434/195 |
| 7,309,233 B2* | 12/2007 | Nguyen | 434/204 |
| 2006/0286515 A1 | 12/2006 | Heil | |

FOREIGN PATENT DOCUMENTS

| | | |
|---|---|---|
| EP | 0496908 | 8/1992 |
| FR | 1 288 048 | 3/1962 |
| GB | 1 451 395 | 9/1976 |
| GB | 1483452 | 8/1977 |
| GB | 2087620 | 5/1982 |
| GB | 2339054 | 1/2000 |
| WO | WO 2005/008614 | 1/2005 |
| WO | WO 2007/091133 | 8/2007 |

OTHER PUBLICATIONS

Learning Resources (RTM), "Hundreds Number Board" [online] As shown and described on website. Available from URL: Learning Resources (RTM) [Accessed Oct. 2, 2009].

UKIPO Search Report for priority Patent Application No. GB 0703459.8 (search report dated Oct. 18, 2007), 1 page.

UKIPO Search Report for priority Patent Application No. GB 0802991.0 (search report dated Jun. 12, 2008), 2 pages.

UKIPO Combined Search and Examination Report for priority Patent Application No. GB 0802991.0 (dated Jun. 13, 2008), 3 pages.

International Search Report for corresponding International Patent Application No. PCT/GB2008/050107, mailed May 8, 2008, 3 pages.

Written Opinion for corresponding International Patent Application No. PCT/GB2008/050107 (6 pages), mailed May 8, 2008.

\* cited by examiner

EDUCATIONAL DEVICE

RELATED CASE INFORMATION

This application is a 371 US National Stage Application of International Application No. PCT/GB2008/050107, filed on Feb. 19, 2008, claiming priority to British application no. GB 0703459.8, filed on Feb. 22, 2007 and European application no. EP 07102897.1, filed on Feb. 22, 2007, the entire disclosures of which are incorporated herein by reference.

The present invention relates to a device or apparatus intended for educational use and, in particular, to apparatus intended to assist children in the task of learning the basic skills required to perform mental arithmetic.

When children are learning the basics of arithmetic, they often use their fingers to assist with simple calculations. However, many children encounter difficulties in progressing beyond the manipulation of single digit numbers, as there is little available by way of simple calculating aids to fill the gap between the ten fingers on two hands and considerably more sophisticated devices, such as electronic calculators and slide-rules, or even the abacus. Moreover, many of these more sophisticated devices provide little insight into the mathematical principles that lie behind the calculations they can be used to perform and, thus, are of little use in teaching these principles to young children. There is a requirement, therefore, for a simple and intuitive apparatus, which can aid children in the development of the thought patterns required to develop a capacity to do more complex mental arithmetic, involving the manipulation of larger and more complex numbers and calculations, beyond the addition and subtraction of single digit numbers.

There have been many attempts to design apparatus intended to offer a solution to this problem in the past. However, to date, all such attempts have resulted in apparatus which is either complex to manufacture or difficult to manipulate, or which simply fails to provide much of the insight that children must acquire, in order to develop the skills they need to become proficient in mental arithmetic.

For example, U.S. Pat. No. 2,502,238 proposes a device comprising a rectangular array of numbers printed on a card, which is fitted into a tray. A plurality of counters or discs is provided for use with the assembled card and tray, each of which is dimensioned to be capable of covering a single one of the numbers in the array. However, since every disc placed into the tray obscures the number in the array underneath it, the very act of placing discs into the tray prevents a child, using the apparatus, from seeing the numbers that are relevant to the mathematical problem being modelled by the apparatus. The apparatus disclosed in U.S. Pat. No. 3,935,649, U.S. Pat. No. 5,738,524 and U.S. Pat. No. 5,120,226 suffer from similar problems.

An example of apparatus that not only fails to offer a solution to any of the aforementioned problems, but which is also highly complex and, thus, difficult or expensive to manufacture, is that described in U.S. Pat. No. 3,755,924.

It is an object of the present invention to provide apparatus that provides a solution to the problem outlined above, whilst not suffering from the drawbacks of known devices or apparatus.

Thus, the invention relates to apparatus comprising a plurality of pieces and means carrying a regular array of indicia, wherein the pieces are dimensioned and arranged, and the indicia are arrayed, to allow a plurality of said pieces to be juxtaposed adjacent to the indicia, covering a plurality of the indicia, such that each piece covers a single indicium or an integral number of indicia and each indicium covered by a piece is visible through that piece.

According to the present invention, there is provided apparatus comprising a plurality of pieces, each comprising a transparent or translucent material with a higher refractive index than air, and means carrying a regular array of indicia, wherein the pieces are dimensioned and arranged, and the indicia are arrayed, to allow a plurality of said pieces to be juxtaposed adjacent to the indicia, covering a plurality of the indicia, such that each piece covers a single one or an integral number greater than one of the indicia and each of the indicia so covered by a piece is visible through the transparent or translucent material in that piece. Preferably, the apparatus is arranged for use by children and to be useful in educating them in arithmetical or mathematical skills.

Thus, the indicia are always substantially visible to a user, whether covered by a piece or not, and every piece placed over the indicia can be located so as to cover just a single indicium or an integral number of indicia. As a result, unlike previously known devices, apparatus in accordance with the invention can provide a simple model for many arithmetical problems. Moreover, because the pieces are formed from a material with a higher refractive index than air, when one is placed over one or more of the indicia, the latter appear(s) nearer to the surface of the covering piece than it is in reality located and attention, thus, is drawn to it.

Preferably, each piece is dimensioned and arranged to allow a first piece to be juxtaposed adjacent to the indicia, covering a first single one or group of the indicia, and a second piece to be juxtaposed adjacent to said first piece, covering a second single one or group of the indicia adjacent to said first single one or group of the indicia, wherein each first indicium is visible through the transparent or translucent material in said first piece and each second indicium is visible through the transparent or translucent material in said second piece.

In this specification, when an indicium or indicia is or are said to be covered by a piece, it is preferred that the indicium or indicia concerned is or are completely covered by the piece. Where an indicium or indicia is or are said to be visible through a piece, it is preferred that all or substantially all of the indicium or indicia concerned is or are visible through the piece. Moreover, all references to an indicium and to indicia should be understood to be references to an indicium or indicia in the regular array of indicia.

In preferred embodiments, the indicia or indicium covered by a piece can only be viewed through that piece. With certain such embodiments, an observer will be able to see a covered indicium or indicia through a combination of the covering piece and an adjacent piece. In these latter embodiments, the pieces are dimensioned and arranged such that, having passed through a covering piece, some light travelling from the vicinity of a covered indicium or group of indicia can pass through the adjacent piece before reaching the observer. It is preferred, however, for the pieces to be dimensioned and arranged so as to prevent this from happening at least from a majority and, preferably, all viewing angles.

Preferably, each piece is dimensioned and arranged to cover only a single one of the indicia and to allow an adjacent single one of the indicia to be covered by a second of the pieces, wherein each so covered indicium is visible through the transparent or translucent material in the piece covering it.

It is preferred for the pieces to be of substantially the same shape or form. Moreover, the pieces can comprise a plurality, preferably two, distinct populations. The populations of pieces can be distinguished by markings or colour, preferably colour. An advantage of embodiments, in which the pieces comprise such distinct populations, is that pieces from a first population can be used to represent a first number in an arithmetical problem, pieces from a second population can be used to represent a second number in that problem, and so on.

In preferred embodiments, the pieces consist entirely or essentially of a transparent or translucent material and it is further preferred for this material to have a higher refractive index than air. Preferred materials for forming the pieces include glass and polymeric plastics, such as polymethylmethacrylate (as available, for example, under the trade mark Perspex®) and the like. In preferred embodiments, the pieces are formed from a coloured transparent polymeric material or glass. When formed from such materials, whether coloured or not, it is preferred for each piece to be monolithic (i.e., to be formed from a single piece of the same material) and, preferably, to have a first face for covering an indicium or group of indicia and a second face through which the covered indicium or indicia can be viewed. The first and second faces can be substantially flat and substantially parallel to each other. In alternative embodiments, the first face can be flat and the second can be convex. It is preferred for the pieces to be substantially cuboidal or cubical and to be formed, preferably entirely, from a transparent plastic (polymeric) material, or glass. In some embodiments, however, they can take the form of sheets of such materials.

An advantage of many of these latter embodiments is that the pieces are simple to manufacture and easy for a child to manipulate. Moreover, when monolithic pieces manufactured from a material with a higher refracted index than air are placed over the indicia, the effect of each covered indicium appearing nearer to the surface of the piece than it is in reality located is enhanced. Pieces of this type can also be shaped such that, as a result of internal reflections within them, it is substantially impossible, except possibly from a few extreme angles, for a covered indicium or group of indicia to be viewed through a combination of the covering piece and another adjacent piece.

The means carrying the regular array of indicia can comprise a base or a tray and can define a substantially flat surface on which the pieces can be moved substantially freely. In an alternative embodiment, the means carrying the indicia can comprise locating means arranged to locate one or a plurality of pieces in position, each covering a single indicium or an integral number of indicia. Matching locating means can be carried on each of the pieces.

The means carrying the indicia can comprise a tray forming a boundary around the array of indicia and the array of indicia can comprise a regular array of alphanumeric characters, preferably numerals. In a preferred embodiment, the indicia are numerals and they are in a rectangular array. The array, preferably, consists of ten rows and ten columns, and preferably includes all of the numbers 1-100 in ascending order. In embodiments, the array can start with "1" in the top left hand corner and end with "100" in the bottom right, or start with "1" in the bottom left hand corner and end with "100" in the top right.

The apparatus can further comprise a case, which also defines the means carrying the indicia, or a board, which can define the means carrying the indicia.

In an embodiment, the apparatus can comprise a tray (which can be formed from a plastic or polymeric material such as polystyrene) on which there is inscribed, printed, or moulded an array of numbers within a grid. In some embodiments the grid is visible, but in others it is not. The grid can be 10 squares by 10 squares and contain the numbers from 1 to 100. The pieces can comprise a plurality of transparent cubes, formed from a polymeric material or glass, with half of the cubes being of one colour and the other half of another. Due to the optical properties of the cubes in this embodiment i.e., their transparency and high refractive index relative to the air, each number that is covered by one of the cubes can be seen from most angles and it appears to jump out to the observer as the refractive index of the material employed to form the cube causes the number to appear nearer to its surface than it is in reality located.

In an alternative, preferably large-scale, embodiment, the means carrying the regular array of indicia comprises a screen or board that, preferably, can be mounted substantially vertically, for example, onto an interior wall of a building that may be, for example, in a classroom. In this embodiment, the means carrying the array of indicia can appear like a traditional teacher's "whiteboard". The indicia can be permanently marked on the screen or board, or applied by temporary marking means, such as a felt tip pen or the like. The screen or board can be formed from, or include within its construction, a magnetic material, such as iron or steel. The pieces can each comprise a sheet of transparent plastic material and each piece can carry a single or a plurality of magnets. The magnets can be arranged so as to allow a piece to be temporarily fixed to the screen or board by magnetic attraction between the magnets and the magnetic material within the screen or board. Similar (possibly smaller) pieces and magnetic arrangements can be used in other embodiments of the invention.

Specific embodiments of the present invention will now be described and with reference to the accompanying drawings. These embodiments are provided by way of example only and are not intended to be limiting in any way.

Figure 1:
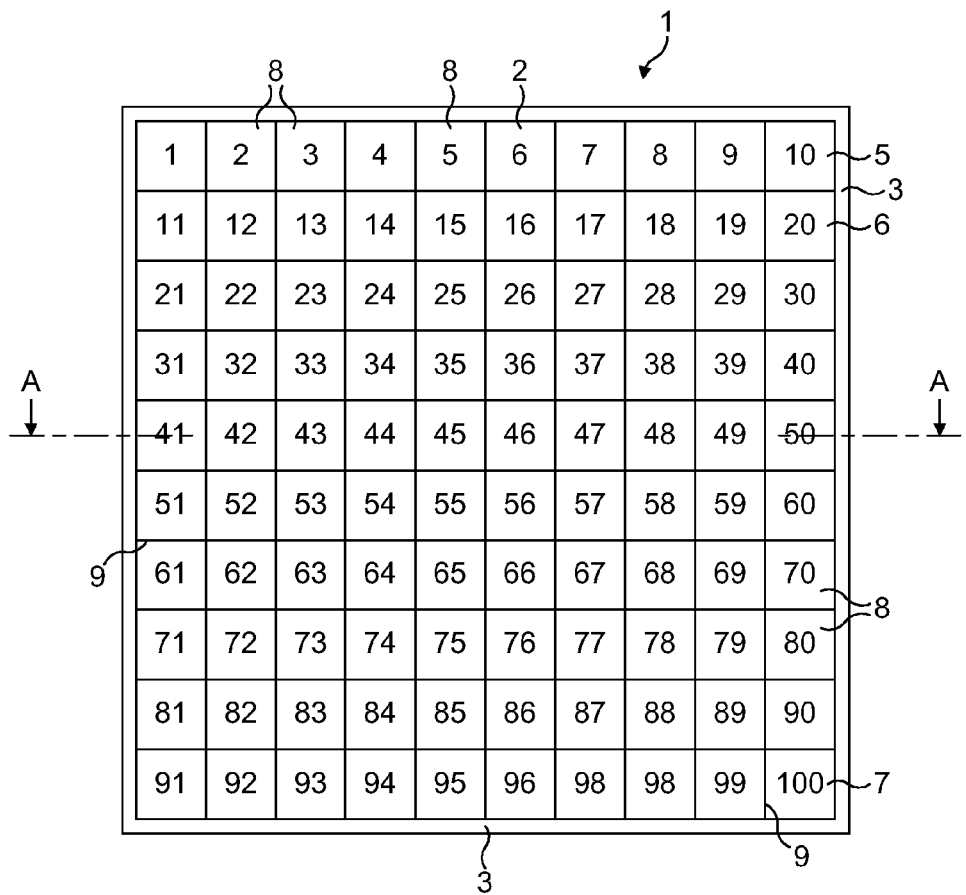
FIG. 1 is a plan view of a tray forming apparatus in accordance with the invention.
Figure 2:
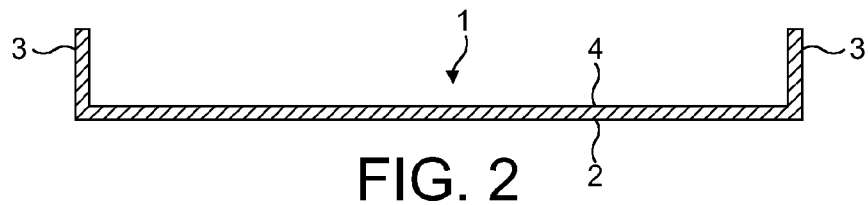
FIG. 2 is a section through the tray shown in FIG. 1, on the line A-A.

The tray 1, shown in FIGS. 1 and 2, comprises a substantially rectangular base 2 surrounded by a peripheral wall 3, which up-stands from a first face 4 of the base 2. The tray 1 can be formed from a plastic polymeric material, such as polystyrene. The numbers 1-100 are printed on the first face 4 of the base 2 in a regular array of ten rows and ten columns, with the numbers 1-10 in a first row 5, the numbers 11-20 in a second row 6, and so on up until the numbers 91-100, which are in the tenth row 7. Each of the numbers 1-100 is printed within a square 8 of a grid defined by a plurality of printed lines 9. The printed lines 9 define one hundred individual grid squares 8.

Figure 3:
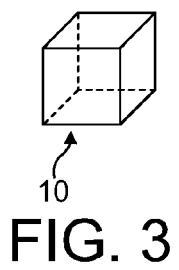
FIG. 3 is a perspective drawing of a piece for use in the tray shown in FIGS. 1 and 2.

The tray 1 is supplied with one hundred cubical playing pieces 10, formed from monolith of a transparent plastic polymeric material, and such as polystyrene or polymethylmethacrylate. Fifty of the pieces 10 are coloured yellow and fifty are coloured blue. FIG. 3 shows one of the playing pieces 10. Each of the playing pieces 10 is dimensioned to fit exactly over a grid square 8. The tray 1 can be supplied with a lid, not shown, which fits in the opening defined by the walls 3 and is provided with means, not shown, allowing it to be removably engaged to the tray 1. When in position, the lid is able to retain all of the playing pieces 10 within the tray.

The function of the apparatus can be illustrated by considering a simple arithmetical task, such as that of adding together two numbers, say 5 and 6. To do this, having firstly removed all of the pieces 10 from the tray 1, a child would take five blue pieces 10 and six yellow ones and place them into the grid squares 8, working from left to right in the first row 5 and placing the overflow into the second row 6 (again working from left to right). The numbers in the covered grid squares 8 would be clearly visible through the transparent playing pieces 10 and the child would easily be able to see the answer, eleven, through the last of the playing pieces 10 placed into the grid squares 8. As all of the numbers covered by the playing pieces 10 are clearly visible to the child, each through the piece that covers it, he or she is provided with a very clear visual representation of the arithmetical sum that he or she has just solved using the apparatus.

Figure 4:
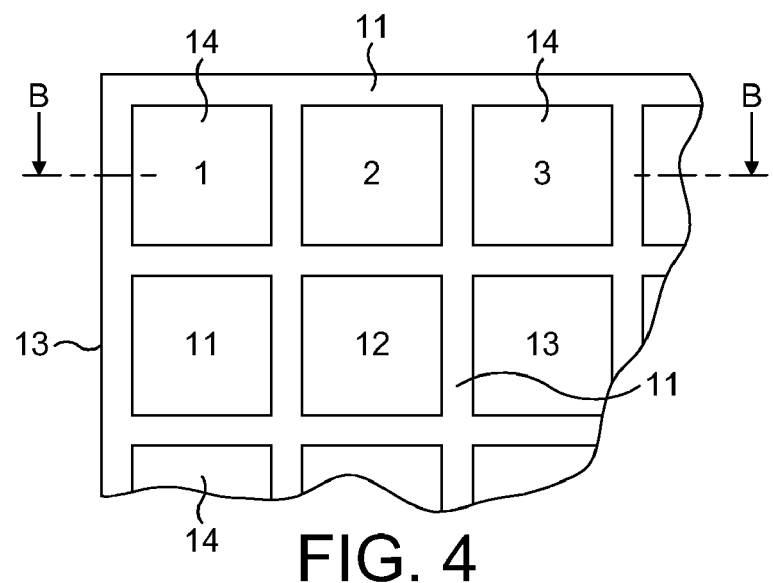
FIG. 4 is a scrap view of a portion of an alternative embodiment of the tray shown in FIG. 1.
Figure 5:
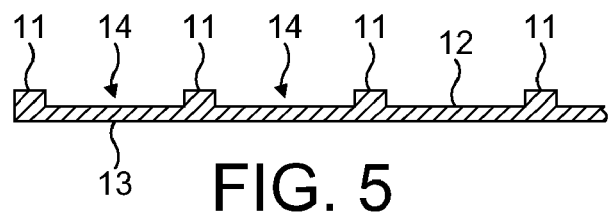
FIG. 5 is a scrap section through the tray shown in FIG. 4, on line B-B.
Figure 6:
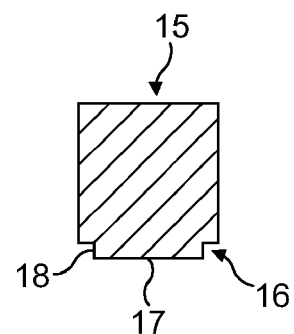
FIG. 6 is a section through a piece for use with the tray shown in FIGS. 4 and 5.

An alternative embodiment of the tray 1 is shown in FIGS. 4 and 5. In this alternative embodiment an array of ridges 11 up-stands from a first face 12 of a rectangular base 13, and defines one hundred rectangular depressions 14, arranged in a grid of ten rows and ten columns. The numbers 1-100 are moulded into the first face 12 of the base 13, with one number located in each of the rectangular depressions 14, in an array substantially as shown for the tray 1, illustrated in FIG. 1. This alternative embodiment is supplied with one hundred transparent substantially cuboidal playing pieces 15. Fifty of the playing pieces 15 are blue and fifty are yellow. A section through one of the playing pieces 15 is shown in FIG. 6. As can be seen in FIG. 6, a step 16 is formed around the periphery of one of the faces 17 of the piece 15 so as to define a short rectangular cross-sectioned spigot 18. The spigot 18 is dimensioned to fit snugly within any one of the rectangular depressions 14, so as to retain the associated piece 15 in the depression 14.

Figure 7:
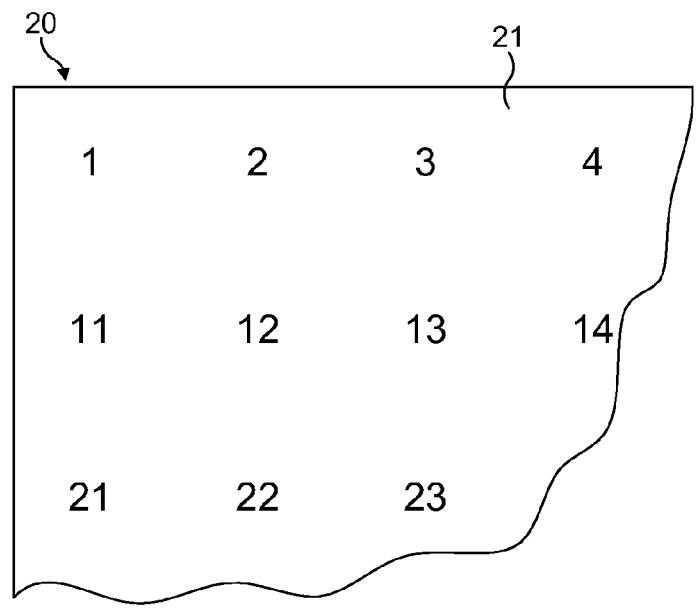
FIG. 7 is a scrap view of a portion of a board forming apparatus in accordance with the invention.
Figure 8:
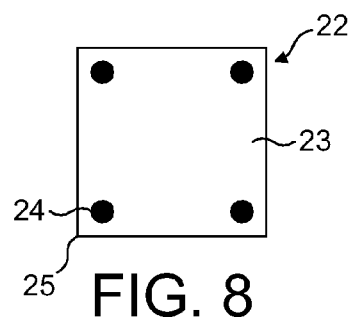
FIG. 8 is a plan view of a first type of piece for use with the board shown in FIG. 7.
Figure 9:
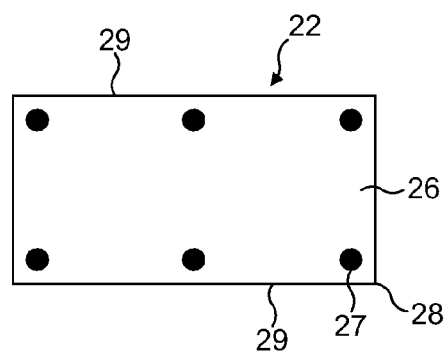
FIG. 9 is a plan view of a second type of piece for use with a board as shown in FIG. 7.

An alternative embodiment of the invention is shown in FIGS. 7, 8 and 9. This embodiment is a large-scale version of the embodiments so far described and, instead of a tray, the means carrying the indicia takes the form of a substantially rectangular board 20 arranged to be attached substantially vertically to an interior wall of a building, for example, in a classroom. The board 20 can be formed from, or include within its construction, a magnetic material, such as sheet steel. The numbers 1-100 are printed on to a first face 21 of the board 20 in an array substantially as shown for the tray 1, illustrated in FIG. 1. Alternatively, the numbers can be written on to the first face 21 of the board 20, using a marker pen or the like. The first face 21 of the board 20 is preferably white, or a like light colour.

Examples of pieces employed in this second alternative embodiment of the invention are shown in FIGS. 8 and 9. A piece 22, shown in FIG. 8, comprises a substantially square sheet of plastic material 23 carrying four magnets 24, one of which is fixed in each of the corners 25 of the sheet 23. An alternative form of piece 22 is shown in FIG. 9. This piece 22 comprises a rectangular sheet of plastic material 26. The sheet 26 carries a total of six magnets 27, four of which are located in the corners 28 of the sheet 26. Two of the magnets 27 are located midway along the longer two edges 29 of the sheet 26. Each sheet 23 is dimensioned to cover a single one of the numbers 1-100 carried by the board 21, such that a plurality of sheets 23 can be placed adjacent to each other in such a way that each of them covers only a single one of the numbers 1-100. The sheet 26 is dimensioned to cover just two of the numbers 1-100. Additional pieces, each formed in a like manner to the pieces 22 shown in FIGS. 8 and 9, but dimensioned to cover five, ten, or even larger groups of the numbers 1-100, can also be employed with this embodiment of the invention. As with other embodiments of the invention, the sheets 23 and 26 can be supplied in different colours, such as blue and yellow.

To use this embodiment of the invention, any of the pieces 22 can be placed onto the face 21 of the board 20, such that the magnets 24 or 27 cause the piece 22 to become temporarily fixed to the board 20 and to be held in place on the board 20. Otherwise, the operation of this embodiment is the same as the operation of any other embodiment of the invention.

The invention claimed is:

1. Apparatus comprising a plurality of pieces and a base, board, screen or tray carrying a regular array of indicia, wherein the pieces are dimensioned and arranged, and the indicia are arrayed, to allow a plurality of said pieces to be juxtaposed adjacent to the indicia, covering a plurality of the indicia, such that each piece covers a single one or an integral number greater than one of the indicia, wherein the pieces each comprise a transparent or translucent material, each of the indicia so covered by a piece is visible through the transparent or translucent material in that piece, said transparent or translucent material has a higher refractive index than air, and each piece is shaped such that, as a result of internal reflections within the transparent or translucent material in said piece, it is substantially impossible for a covered one or group of the indicia to be viewed through a combination of the covering piece and another adjacent piece.

2. Apparatus as claimed in claim 1, wherein each piece is dimensioned and arranged to allow a first piece to be juxtaposed adjacent to the indicia, covering a first single one or group of the indicia, and a second piece to be juxtaposed adjacent to said first piece, covering a second single one or group of the indicia adjacent to said first single one or group of the indicia, wherein each first indicium is visible through the transparent or translucent material in said first piece and each second indicium is visible through the transparent or translucent material in said second piece.

3. Apparatus as claimed in claim 1, wherein said indicium or indicia covered by a piece can only be viewed through the transparent or translucent material in that piece.

4. Apparatus as claimed in claim 1, wherein each piece is dimensioned and arranged to cover only a single one of the indicia and to allow an adjacent single one of the indicia to be covered by a second of the pieces, and each so covered indicium is visible through the transparent or translucent material in the piece covering it.

5. Apparatus as claimed in claim 1, wherein the pieces are of substantially the same shape or form.

6. Apparatus as claimed in claim 1, wherein the pieces comprise a plurality of distinct populations.

7. Apparatus as claimed in claim 6, wherein the populations of pieces are distinguished by markings or colour.

8. Apparatus as claimed in claim 1, wherein the pieces consist or consist essentially of said transparent or translucent material.

9. Apparatus as claimed in claim 1, wherein each piece is monolithic.

10. Apparatus as claimed in claim 1, wherein each piece has a first face for covering one or a group of the indicia and a second face through which said covered indicium or indicia can be viewed.

11. Apparatus as claimed in claim 10, wherein the first and second faces are substantially flat and substantially parallel to each other.

12. Apparatus as claimed in claim 10, wherein each piece is dimensioned and arranged such that the distance between its first and second faces is substantially equal to or greater than half, or all of the maximum span of at least one of said indicia.

13. Apparatus as claimed in claim 1, wherein said transparent or translucent material is glass or a plastic.

14. Apparatus as claimed in claim 13, wherein material forming some or all of the pieces is coloured transparent glass or plastic.

15. Apparatus as claimed in claim 1, wherein the pieces are substantially cuboidal or cubical.

16. Apparatus as claimed in claim 1, wherein the base, board, screen or tray carrying the regular array of indicia define a substantially flat surface on which one or a plurality of the pieces can be moved substantially freely.

17. Apparatus as claimed in claim 1, wherein the base, board, screen or tray includes an array of depressions arranged to locate one or a plurality of pieces in position, each covering a single one or an integral number greater than one of the indicia.

18. Apparatus as claimed in claim 17, wherein each piece carries a spigot dimensioned to fit within any one of the depressions to thereby retain the piece in place on the base, board, screen or tray.

19. Apparatus as claimed in claim 1, wherein the base, board, screen or tray is formed from, or includes within its construction, a magnetic material.

20. Apparatus as claimed in claim 19, wherein the pieces each comprise a single or a plurality of magnets.

21. Apparatus as claimed in claim 19, wherein the magnetic material includes iron or steel.

22. Apparatus as claimed in claim 1, wherein the regular array of indicia are carried by a tray that forms a boundary around the array of indicia.

23. Apparatus as claimed in claim 1, wherein the array of indicia comprises a regular array of alphanumeric characters.

24. Apparatus as claimed in claim 23, wherein the array of indicia comprises numerals.

25. Apparatus as claimed in claim 1, wherein the indicia are numerals and they are in a rectangular array.

26. Apparatus as claimed in claim 25, wherein the array consists of ten rows and ten columns, and includes all of the numbers 1-100 in ascending order.

27. Apparatus as claimed in claim 26, wherein the array starts with "1" in the top left hand corner and ends with "100" in the bottom right.

28. Apparatus as claimed in claim 26, wherein the array starts with "1" in the bottom left hand corner and ends with "100" in the top right.

\* \* \* \* \*